United States Patent [19]

Hofer et al.

[11] 3,948,946

[45] Apr. 6, 1976

[54] CYCLIC ACETALS AND MERCAPTALS

[75] Inventors: Kurt Hofer, Munchenstein; Anton Voykowitsch, Binningen, both of Switzerland

[73] Assignee: Sandoz Ltd., (Sandoz AG), Basel, Switzerland

[22] Filed: Sept. 20, 1974

[21] Appl. No.: 507,811

Related U.S. Application Data

[63] Continuation of Ser. No. 300,199, Oct. 24, 1972, abandoned.

[30] Foreign Application Priority Data

Oct. 26, 1971  Switzerland...................... 15641/71

[52] U.S. Cl....... 260/327 M; 260/340.3; 260/340.7; 260/340.9; 252/393

[51] Int. Cl.$^2$....................................... C07D 339/06
[58] Field of Search......... 260/327 M, 340.3, 340.7, 260/340.9

[56] References Cited

UNITED STATES PATENTS 3,347,871  10/1967  Hofer et al...................... 260/340.7

Primary Examiner—John D. Randolph
Assistant Examiner—C. M. S. Jaisle
Attorney, Agent, or Firm—Gerald D. Sharkin; Richard E. Vila; Thomas C. Doyle

[57] ABSTRACT

The invention provides novel cyclic acetals and mercaptals useful as stabilising agents for organic susceptible to degradation by heat or oxygen.

23 Claims, No Drawings

CYCLIC ACETALS AND MERCAPTALS

This is a continuation, of application Ser. No. 300,199 filed Oct. 24, 1972 now abandoned.

This invention relates to novel cyclic acetals and mercaptals.

More particularly, this invention provides compounds of formula I,

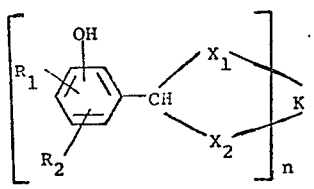

in which
- $R_1$ signifies a tertiary alkyl radical of up to 12 carbon atoms and is in a position adjacent to the hydroxy group,
- $R_2$ signifies a hydrogen atom, an alkyl or cycloalkyl radical of up to 20 carbon atoms, or a phenyl radical which may be substituted by one or two alkyl radicals of 1 to 4 carbon atoms,
- $n$ signifies 1 to 2,
- K signifies a 2n-valent hydrocarbon radical of 2 to 12 carbon atoms and consisting of aromatic and/or saturated aliphatic units in which one —C—C— bond may be replaced by a —C—O—C—bond, and
- $X_1$ and $X_2$, which may be the same or different, each signifies an oxygen or sulphur atom, $X_1$ and $X_2$ being bonded to adjacent or next adjacent atoms in the radical K,
  - provided that when $n$ is 2, the two divalent radicals attached to the radical K may be the same or different.

Examples of suitable tertiary alkyl radicals for $R_1$ include the following:- tertiary butyl, 2-methyl-2-butyl, 2,3-dimethyl-2-butyl, 2-methyl-2-pentyl, 3-ethyl-3-pentyl, 2,4-dimethyl-2-2-methyl-2-hexyl, 3-methyl-3-hexyl, 3,4-dimethyl-3-hexyl, 3,5-dimethyl-3-hexyl, 2-methyl-2-heptyl, 3-methyl-3-heptyl, 4-methyl-4-heptyl, 2,3,4-trimethyl-3-pentyl, 2,4,4-trimethyl-2-pentyl, 3-ethyl-3-heptyl, 2-methyl-2-octyl, 4-methyl-4-octyl, 3,6-dimethyl-3-octyl, 3,7-dimethyl-3-octyl, and 2,4,4,6,6-pentamethyl-2-heptyl. $R_1$ preferably, however, contains 4 to 8 carbon atoms and is most preferably, tertiary butyl.

Suitable alkyl radicals for $R_2$ may be normal, secondary, tertiary or otherwise branched. Examples of such radicals include the following: all n-alkyl radicals of 1 to 20, in particular 1 to 12, preferably 1 to 8 carbon atoms, most preferably methyl; secondary alkyl radicals of 3 to 20, in particular 3 to 12, preferably, 3 to 8 carbon atoms, such as isopropyl, 2-butyl, 3-methyl-2-butyl, 2-pentyl, 2,2-dimethyl-3-butyl, 2-hexyl, 3-hexyl, 2-methyl-3-pentyl, 3-methyl-2-pentyl, 4-methyl-2-pentyl, 2,2-dimethyl-3-pentyl, 2,4-dimethyl-3-pentyl, 2-heptyl, 3-heptyl, 4-heptyl, 2-methyl-3-hexyl, 4-methyl-3-hexyl, 5-methyl-3-hexyl, 3-ethyl-4-hexyl, 2,2-dimethyl-3-hexyl, 2,4-dimethyl-3-hexyl, 2,5-dimethyl-3-hexyl, 3,4-dimethyl-2-hexyl, 2-methyl-3-heptyl, 3-methyl-2-heptyl, 3-methyl-4-heptyl, 4-methyl-3-heptyl, 5-methyl-3-heptyl, 6-methyl-2-heptyl, 2-octyl, 3-octyl, 4-octyl, 2,2,4-trimethyl-3-pentyl, 5-ethyl-2-heptyl, 2,2-dimethyl-3-heptyl, 2,6-dimethyl-4-heptyl, 2-methyl-3-octyl, 3-methyl-4-octyl, 6-ethyl-3-octyl, 2-or 5- decyl, 2,2-dimethyl-3-octyl, 2-methyl-4-nonyl, 3-methyl-4-nonyl, 6-ethyl-3-decyl, 7-ethyl-2-methyl-4-nonyl, 2-dodecyl, 2,2,8-trimethyl-4-nonyl, 2-tridecyl, 2-tetradecyl, 2-pentadecyl, 2-hexadecyl, 2-nonadecyl; alkyl radicals bound to the benzene ring via a primary carbon atom and otherwise branched and having 3 to 20, in particular 3 to 12, preferably 3 to 8 carbon atoms, such as 2-methyl-1-propyl, 2,2-dimethyl-1-propyl, 2-methyl-1-butyl, 2-ethyl-1-butyl, 2,2-dimethyl-1-butyl, 2-methyl-1-pentyl, 3-methyl-1-pentyl, 4-methyl-1-pentyl, 2,4-dimethyl-1-pentyl, 2-ethyl-1-hexyl, 2,2-dimethyl-1-hexyl, 2,2,4-trimethyl-1-pentyl, 4-methyl-2-propyl-1-pentyl, 3,7-dimethyl-1-octyl and 2,2-dimethyl-1-decyl; tertiary alkyl radicals of 4 to 20, in particular 4 to 12, preferably 4 to 8 carbon atoms such as those given above for $R_1$.

Preferred cycloalkyl radicals for $R_2$ include cycloalkyl radicals of 3 to 8, preferably 5 to 7 carbon atoms, such as cyclohexyl.

Suitable susbstituted phenyl radicals for $R_2$ include phenyl substituted by one or two of the $C_{1-4}$ alkyl radicals mentioned above, in particular methyl or tertiary butyl.

$R_2$ preferably signifies hydrogen, methyl, t-butyl, phenyl or t-butylphenyl, more preferably methyl, t-butyl or phenyl.

Suitable divalent, aliphatic radicals for K include those of 2 to 12, in particular 2 to 9 carbon atoms, such as ethylene, trimethylene, propylene, 1,3- and 2,3-butylene, 2,2-dimethyl-1,3-propylene, 2,4-pentylene, 3-methyl-2,4-pentylene, 2,2-diethyl-1,3-propylene, 2-methyl-2-propyl-1,3-pentylene, 2-ethyl-1,3-hexylene, 3-methyl-2,4-heptalene, 2,2,4-trimethyl-1,3-pentylene, 2-ethyl-2-butyl-1,3-propylene and 1,2-cyclohexylene. Suitable aromatic divalent radicals include those of 6 to 12, in particular 6 to 8 carbon atoms, such as 1,2-phenylene, 2,3-naphthalene-diyl, and 5-methyl-1,2-phenylene. Suitable divalent araliphatic radicals are those of from 7 to 12, in particular 7 to 9 carbon atoms, such as $\alpha$,2-toluenediyl, 5-methyl-$\alpha$,2-toluenediyl. Suitable radicals containing an oxygen atom include 3-methoxy-1,2-phenylene, methoxy-methylethylene and benzyloxymethylethylene. Preferred divalent radicals for K include 2,2-dimethyl-1,3-propylene, ethylene, 5-methyl-1,2-phenylene, and the radical

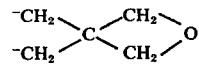

Suitable tetravalent radicals for K include aliphatic hydrocarbon radicals of 4 to 8 carbon atoms, such as meso-1,2,3,4-butantetrayl and neopentantetrayl.

$X_1$ and $X_2$ preferably each signifies oxygen.

The preferred compounds of formula I are those having a molecular weight of at least 300, preferably at least 500.

The invention also provides a process for the production of compounds of formula I characterised by reacting a compound, or a mixture of compounds, of formula II,

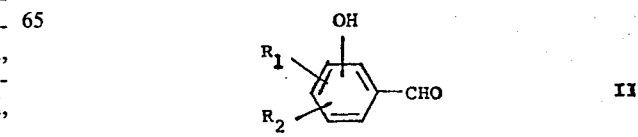

in which $R_1$ and $R_2$ are as defined above, or a functional derivative thereof, with a compound of formula III,

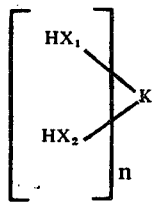

in which K, $X_1$, $X_2$ and n are as defined above, or a functional derivative thereof.

The process may be carried in manner conventional for producing acetals and mercaptals from aldehydes and alcohols or mercaptans, see, for example, Houben-Weyl, Methodes der Organisches Chemie, 4th edition, 1965, Vol.VI/3, p.199ff., Vol.IX,p.195ff and Bachler and Pearson, Survey of Organic Syntheses, 1970, p.513ff. The process is suitably catalytically accelerated by proton donors and Lewis acids, such as hydrogen halides, boron trifluoride etherate, trifluoracetic acid, sulphuric acid and strongly acid exchange resins from cations such as Dowex SO. When using alcohols of formula III, at least, the process is suitably carried out at a temperature of at least 50°C, preferably from 80° to 170°C. Suitably, the process is effected in the presence of a solvent which removes the water of condensation as it evaporates. Suitable solvents include benzene, toluene, xylene, cymene and chlorobenzene, optionally in admixture with polar solvents such as dimethyl sulphoxide or t-butyl-phenol.

With mercaptans, the process may proceed more smoothly than with alcohols and satisfactory results may in this event be obtained at room temperature and in the presence of glacial acetic acid and hydrogen chloride.

Suitable functional derivatives of the compounds of formula II are well known, e.g from the publications mentioned above, and include acetals and mercaptals with lower, monovalent alcohols, anils, 2,4-dinitrophenyl hydrazones, and oximes.

Suitable compounds of formula III are the alcohols and thiols corresponding to the radicals given above for K. Suitable functional derivatives thereof are well known and depend to an extent on the particular compound III. Thus, for example, where the compound is a 1,2-bishydroxy compound, a 1,2-epoxide may be used in place thereof. In this event, the process may suitably be effected at a temperature of from 20° to 50°C and in the presence of tin tetrachloride. Other suitable derivatives of alcohols of formula III are their orthoesters with formic or silicic acid and corresponding imido esters and sulphurous acid esters. Alternatively, a ketal or acetal derived from a lower ketone or aldehyde may suitably be employed. In this event, such are suitably condensed (reacetalysation) with an aldehyde of formula II in the presence of strong acids.

Particular functional derivatives of diols of formula III which may, if desired, be employed in place of the free alcohols include cyclohexene oxide, cyclohexane epimethylene oxide, phenyl ethylene oxide, 1,3-butadiene diepoxide and 1-epoxyethyl-3,4-epoxycyclohexane.

The resulting compounds of formula I may be isolated and purified using conventional techniques.

The compounds of formula II and their functional derivatives are either known or may be produced in conventional manner from available materials. Suitable routes are, for example, described in Coppinger and Campbell, Am.Soc. 75,736 (1953); Vilsmeier and Haak, Ber. 60B,119 (1927); Ferguson, Chem.-Rev.38,227 (1946); Raisen, J. Chem. Soc. 1949,3319; and U.S. Patent 2,903,483 (1959).

The compounds of formula III and their functional derivatives are either known or may be produced in conventional manner from available materials.

The compunds of formula I are useful as stabilisers for organic materials, particularly plastics materials, against degration by the action of heat or oxygen.

For this purpose, they may be incorporated into the substances which are sensitive to oxygen or heat, or applied to these substances to form a protective surface film. The compounds have a wide area of application in plastics technology, being suitable, for example, as stabilizers for the following synthetic polymers and resins: cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde resins, ureaformaldehyde resins, allyl casting resins, polymethyl methacrylate, polyesters and polyacrylonitrile. The disclosed compounds are also suitable for the stabilization of natural materials such as rubber, cellulose, wool and silk. The material for stabilization may be in the form of, for example, film or sheet, tapes, rod, panels, coatings, fibres, granules, powders or other solid forms, or as solutions, emulsions or dispersions. The compounds may be incorporated in or coated on the materials by conventional methods. An important method of application consists in intimately mixing the stabilizing compound with a plastics material, for instance polypropylene in granule form, in a kneader or other suitable machine, followed by extrusion moulding. With this method homogeneous distribution of the stabilizer is obtained, which is important for good protection. The material may be extruded, for example in the form of film, tubing or as filament. The latter may be converted into textiles; in this particular application the stabilizer is therefore incorporated in the polypropylene prior to textile production. It is, however, possible to apply the new stabilizers to textile yarns and fabrics, for example from an aqueous medium containing a finely dispersed compound of formula (I). Textiles of polyester and cellulose acetate fibres are suitable for this method of application.

Synthetic polymers need not necessarily be in the final form when the new compounds are incorporated for stabilization. The compounds of formula I can be mixed with the monomers or prepolymers prior to the condensation or other polymerization reaction giving the final polymer.

Besides being suitable for the stabilization of clear films, plastics and the like, the new compounds are applicable to opaque, semi-opaque and translucent materials with a surface suceptible to degradation by ultra-violet radiation, air and heat. Examples of such materials are foam plastics, opaque films and coatings, opaque papers, opaque and transparent pigmented plastics, fluorescent pigments, automobile and furniture polishes, creams, lotions and related products, which may be either opaque, clear or translucent.

As an example of the relationship between the constitution of compounds of formula (I) and their action, it may be mentioned that satisfactory stabilizing action is evident in polyalkylenes, notably polypropylene, when the substituents in the molecule are predominantly saturated aliphatic groups.

As already indicated, the new compounds may be incorporated into the materials to be stabilised at any stage during their manufacture, using standard methods. The amount of stabilizer employed may vary within wide limits, for example from 0.01 to 5% or preferably from 0.05 to 1% in relation to the weight of the material. The stabilized organic materials may contain compounds of formula (I) above, in admixture with further additives, for example ultra-violet absorbers and other stabilizers against degradation by heat and oxygen. Examples of the latter include organic sulphur, phosphorus and tin compounds and the nickel salts of organic carboxylic acids. In many cases such mixtures of stabilizers provide particularly satisfactory stabilization as they may have a synergistic action.

In the following Examples the parts and percentages are by weight and the temperatures in degrees centigrade.

EXAMPLE 1

A solution of 46.9 parts of 3,5-di-tert.butyl-4-hydroxybenzaldehyde, 21 parts of 2,2-dimethyl-1,3-propane diol and 0.5 parts of 4-toluene-sulphonic acid hydrate in 300 parts of toluene is raised to boiling temperature and reacted with removal of the water of reaction in a separator. After reaction for 6 hours, 85 parts of ethyl acetate are added. The reaction solution is dried over potassium carbonate and the solvent distilled, after which 60 parts of the crude product are obtained. This is recrystallized from hexane to give 2-(4'-hydroxy-3',5'-di-tert.butyl phenyl)-5,5-dimethyl-1,3-dioxane of formula IV,

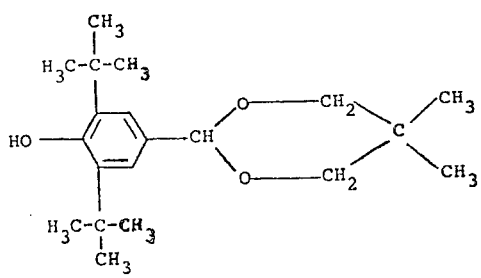

which melts at 134°–135°.

EXAMPLE 2

In accordance with the procedure of Example 1, 120 parts of 4-hydroxy-3,5-di-tert.butyl benzaldehyde are reacted with 34 parts of pentaerythritol in 160 parts of dimethyl sulphoxide, 200 parts of benzene and 0.5 parts of 4-toluene-sulphonic acid hydrate. Subsequent treatment as in Example 1 yields 137 parts of the crude product, which is recrystallized from iso-propanol The condensation product of formula V

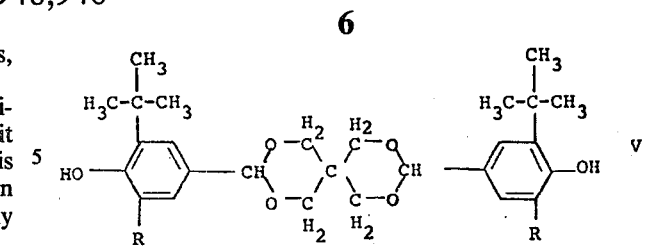

in which R signifies the tertiary butyl radical, is obtained in the pure, colourless form with metling point 256°–257°.

EXAMPLE 3

The condensation reaction as in Example 2 is carried out with 4-hydroxy-3-methyl-5-tert.butyl benzaldehyde in place of 4-hydroxy-3,5-di-tert.butyl benzaldehyde. A colourless compound of formula V in which R signifies the methyl radical is obtained, with melting point 240°–242°. The 4-hydroxy-3-methyl-5-tert.butyl benzaldehyde used as starting material melts at 154°–155°. It can be synthesized according to Vilsmeier and Haak, Ber.60B, 119 (1927), using diethylene glycol diethyl ether as solvent and reacting for 2 hours at 60°. The crude product can be purified by recrystallization from isopropanol.

EXAMPLE 4

If molar amounts of 2-hydroxy-3-tert.butyl-5-methyl benzaldehyde and ethylene glycol are condensed according to the procedure of Example 1, the colourless 2-(2'-hydroxy-3'-tert.butyl-5'-methyl phenyl)-1,3-dioxolan of formula VI,

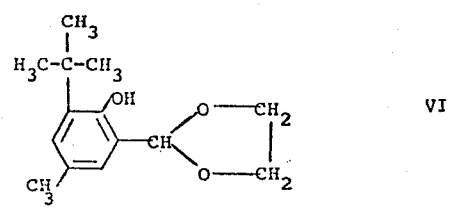

is obtained, which melts at 83°–84°.

The 2-hydroxy-3-tert.butyl-5-methyl benzaldehyde, melting point 71°–73°, used as starting product can be obtained as follows. 164 parts of 2-tert. butyl-4-methyl phenol, 75 parts of hexamethylene tetramine and 125 parts of paraformaldehyde are mixed at 100°. In the course of 1 hour 300 parts of glacial acetic acid are added and the mixture allowed to react for a further 30 minutes. In the next hour 344 parts of concentrated hydrochloric acid are allowed to flow in, then the solution is cooled and run into water. The precipitated aldehyde is crystallized from methanol.

EXAMPLE 5

Molar amounts of 3,5-di-tert.butyl-4-hydroxy benzaldehyde and 1,2-ethane dithiol are condensed by the method described in Example 1 to yield the 2-(4'-hydroxy-3', 5'-di-tert.butyl phenyl)-1,3-dithiolane of formula VII,

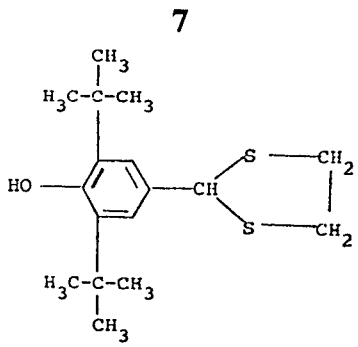

VII

EXAMPLE 6

The condensation reaction as described in Example 1 is carried out with molar amounts of 3,5-di-tert.butyl-4-hydroxy benzaldehyde and toluene-3,4-dithiol after which the 2-(4'-hydroxy-3',5'-di-tert. butyl phenyl)-1,3-(4''-methyl)-benzodithiolane of formula VIII,

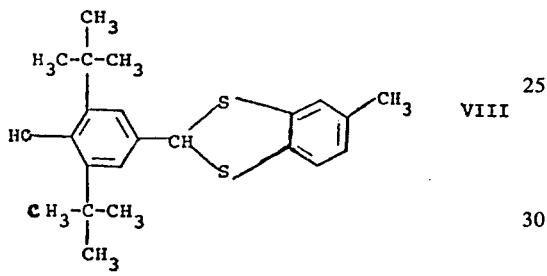

VIII melting point 118°–119°, is obtained.

EXAMPLE 7

In accordance with the procedure of Example 2, 2 mols of 3-tert.butyl-5-cyclohexyl-4-hydroxy benzaldehyde are condensed with 1 mol of pentaery-thrite to yield a product of formula V, melting point 284°–287°, in which R signifies the cyclohexyl radical.

EXAMPLE 8

The condensation of 3,5-di-tert.amyl-2-hydroxy-benzaldehyde with pentaerythritol in the molar ratio of 2:1 is carried out, again in accordance with Example 2. The product has the formula IX,

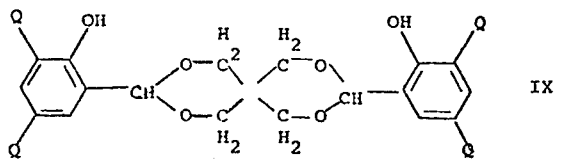

IX in which Q signifies the tertiary amyl radical which melts at 227°–229°.

EXAMPLE 9

6.2 parts of 2-hydroxy-3-tert.butyl-5-(4'-tert.butyl phenyl)-benzaldehyde and 2.2 parts of the spiro compound of formula X,

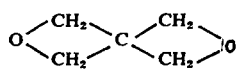

X are dissolved in 40 parts of dichlorethane. A solution of 0.9 parts of tin tetrachloride in 5 parts of dichlorethane is dropped in at room temperature. The reaction solution is stirred overnight and subsequently diluted with 50 parts of toluene, washed with 10% sodium hydroxide solution and then with water, and dried over potassium carbonate. After distillation of the solvent, the residue is recrystallized from ethyl acetate-acetone. Colourless crystals with melting point 184°–187° are obtained in a yield of 2.4 parts. The values for the carbon, hydrogen and oxygen content of the product are in accord with the formula XI,

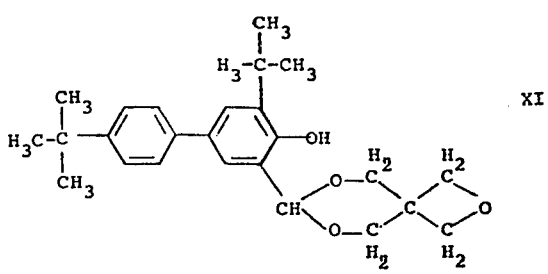

XI

EXAMPLE 10

60 parts of a mixture consisting of 54% 2-hydroxy-3-(2', 2', 4', 40'-tetramethyl butyl)-benzaldehyde, 24% 4-hydroxy-3-(2', 2', 4', 4'-tetramethyl butyl)-benzaldehyde, 11% 2-hydroxy-3,5-bis-(2', 2', 4', 4'-tetramethyl butyl)-benzaldehyde, 9% 4-hydroxy-3,5-bis-(2', 2', 4', 4'-tetramethyl butyl)-benzaldehyde and 2% 2-hydroxy-5-(2', 2', 4', 4'-tetramethyl butyl)-benzaldehyde are dissolved with 25 parts of 2,2-dimethyl-1,3-propane diol and 1 part of 4-toluenesulphonic acid hydrate in 200 parts of toluene. The solution is held at boiling temperature until no further water is collected in the separator, which takes about 6 hours. The toluene solution is washed with 10% sodium carbonate solution and evaporated in vacuum. A yellowish, highly viscous oil is obtained, the infra-red spectrum of which shows the characteristic absorption of the 1,3-dioxane ring with no aldehyde bands. In conformity with the starting aldehyde mixture, it consists of a mixture of phenols of formula XII,

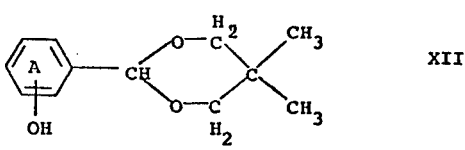

XII in which the benzene ring A is substituted, in some instances once and in others twice, by the tertiary octyl radical.

Application Example

Polypropylene moulding material and 0.4% of the compound of Example 2 in which R signifies a tertiary butyl radical are intimately mixed on a roller mill and the mixture moulded at 180°C in the form of discs of 1 mm thickness and 18 mm diameter. The discs are stored in an oxygen atmosphere at 190°C and 200 mm Hg excess pressure. Oxidation of the polymer causes a fall in pressure. The rate of the decrease in pressure is small if the effectiveness of the stabilizer or stabilizer mixture is high. The effectiveness of stabilization can also be tested by accelerated ageing of a specimen moulding in an oven at 140°C.

What is claimed is:

1. A compound of formula,

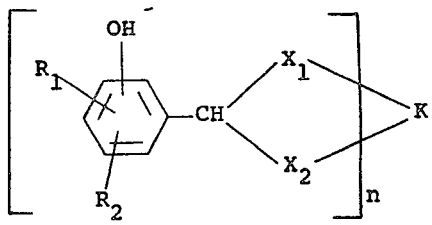

in which
  $R_1$ is tertiary alkyl of up to 12 carbon atoms and is in a position adjacent to the hydroxy group,
  $R_2$ is methyl, t-butyl or phenyl,
  $n$ is 1 or 2,
  K is a 2n-valent hydrocarbon radical of 2 to 12 carbon atoms, selected from the group consisting of divalent saturated aliphatic radicals of 2 to 12 carbon atoms in which one C-C bond may be replaced by a C—O—C bond; 1,2-cyclohexylene; divalent aromatic radicals of 6 to 12 carbon atoms; divalent saturated araliphatic radicals of 7 to 12 carbon atoms; tetravalent saturated aliphatic radicals of 4 to 8 carbon atoms; 3-methoxy-1,2-phenylene and the radical of the formula

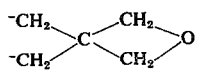

and
  $X_1$ and $X_2$, which may be the same or different, each signifies an oxygen or sulphur atom, $X_1$ and $X_2$ being bonded to adjacent or next adjacent atoms in the radical K, provided that when $n$ is 2, the two divalent radicals attached to the radical K may be the same or different.

2. A compound of claim 1, in which $X_1$ and $X_2$ each is an oxygen atom.

3. A compound of claim 1, in which $R_1$ is radical tertiary alkyl radical of 4 to 8 carbon atoms.

4. A compound of claim 1, in which $R_1$ is tertiary butyl, tertiary amyl or tertiary octyl.

5. A compound of claim 1, in which $R_1$ is tertiary butyl.

6. A compound of claim 1, in which $n$ is 2 and K is a tetravalent radical of 4 to 8 carbon atoms.

7. A compound of claim 1, in which $n$ is 2 and K is meso-1,2,3,4-butantetrayl or neopentantetrayl.

8. A compound of claim 1, having a molecular weight of at least 300.

9. A compound of claim 1, having a molecular weight of at least 500.

10. The compound of claim 13 of formula

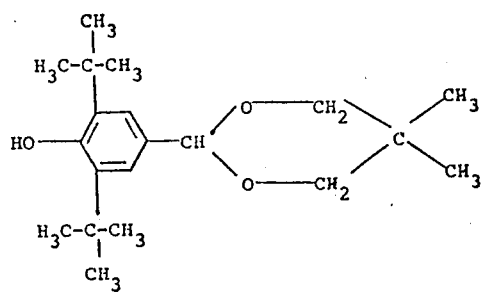

11. The compound of claim 1 of formula

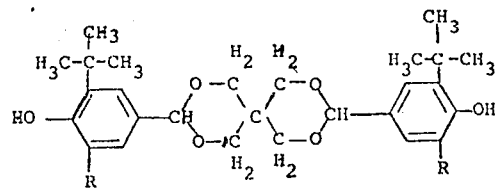

in which each R signifies tertiary butyl.

12. The compound according to claim 1, of the formula

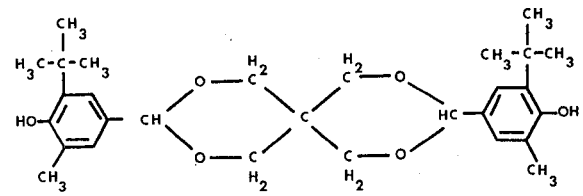

13. A compound of the formula

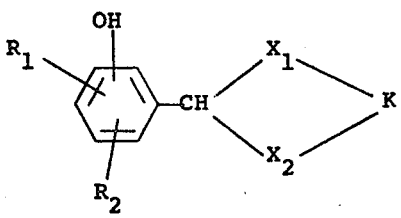

in which
  $R_1$ is tertiary alkyl of up to 12 carbon atoms and is in a position adjacent to the hydroxy group,
  $R_2$ is hydrogen, alkyl or cycloalkyl of up to 20 carbon atoms, or phenyl which may be mono- or di-substituted by alkyl of 1 to 4 carbon atoms,
  K is a divalent hydrocarbon radical of 2 to 12 carbon atoms selected from the group consisting of divalent saturated aliphatic radicals of 2 to 12 carbon atoms in which one C-C bond may be replaced by a C—O—C bond; 1,2-cyclohexylene; divalent aromatic radicals of 6 to 12 carbon atoms; divalent saturated araliphatic radicals of 7 to 12 carbon atoms; 3-methoxy-1,2-phenylene and the radical of the formula

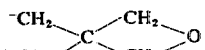

$X_1$ and $X_2$, which may be the same or different, each is oxygen or sulphur, $X_1$ and $X_2$ being bonded to adjacent or next adjacent atoms in the radical K.

14. A compound according to claim 13, wherein $R_2$ is alkyl of 1 to 8 carbon atoms, cycloalkyl of 5 to 7 carbon atoms or phenyl which may be substituted by one or two alkyl radicals of 1 to 4 carbon atoms.

15. A compound according to claim 14, wherein $R_2$ is methyl, t. butyl or phenyl.

16. A compound of claim 13, in which K is 2,2-dimethyl-propylene, ethylene, 5-methyl-1, 2-phenylene, or a radical of formula

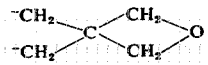

17. The compound of claim 13

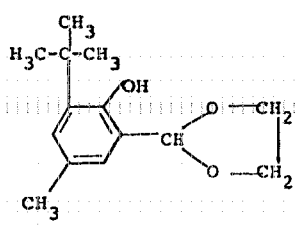

18. The compound of claim 13 of formula

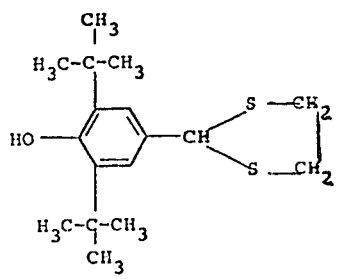

19. The compound of claim 13 of formula

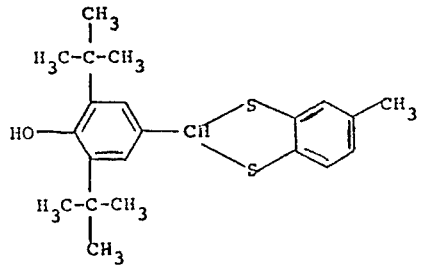

20. The compound of formula

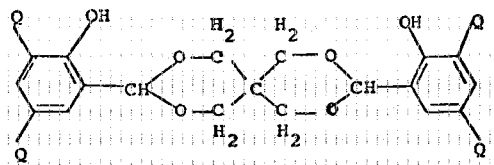

in which each Q signifies the tertiary amyl radical.

21. The compound of claim 13 of formula

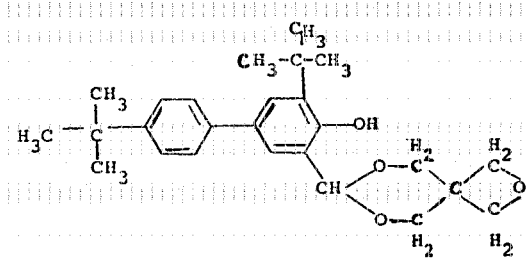

22. The compound of claim 13 of formula

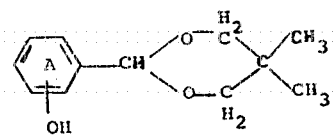

in which the benzene A is substituted by one or two tertiary octyl radicals.

23. The compound of the formula

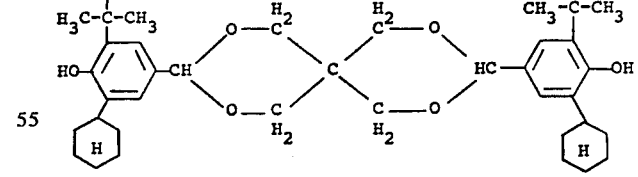

* * * * *